United States Patent [19]

Von Heck

[11] Patent Number: 4,833,442

[45] Date of Patent: May 23, 1989

[54] WHEEL IMMOBILIZER-CHOCK W/INTEGRAL LATCH AND ALARM

[76] Inventor: Robert Von Heck, P.O. Box 84466, San Diego, Calif. 92138

[21] Appl. No.: 63,983

[22] Filed: Jun. 19, 1987

[51] Int. Cl.$^4$ .............................................. B60R 25/00
[52] U.S. Cl. ...................................... 340/427; 70/226; 340/432
[58] Field of Search ...................... 340/568, 65, 63, 64, 340/134; 70/225, 226

[56] References Cited

U.S. PATENT DOCUMENTS

| | | | |
|---|---|---|---|
| 3,824,536 | 7/1974 | Cherico | 340/568 |
| 3,882,453 | 5/1975 | Mule | 340/65 |
| 3,907,072 | 9/1975 | Shafer | 70/226 |

OTHER PUBLICATIONS

The "Auto Security-Boot", shown, p. 78, Aug. '88, Popular Science magazine; from the United Kingdom (but USA publication).
The "Great Amer. Aluminum Challenge", shown, p. 30, 20 Jun. '88, Design-News magazine (USA publication).
The 'Auto Club News', p. 3, Oct.-Nov. '87 issue titled article: "Scofflaws, Beware; L.A. Gets Tough on Parking Citations".

Primary Examiner—Joseph A. Orsino
Assistant Examiner—Jeffery A. Hofsass

[57] ABSTRACT

An anti-theft security device, attachable to various types of parked vehicles, such as motorcars, motorcycles, light-aircraft, etc.; said device having a preferred wedge shaped profile as viewed installed from the wheel axial direction, and having clincher like appendage elements extending radially inwardly therefrom toward the wheel-axle on both opposed sides of the tire and rim-flange in a jaw like manner, thereby rendering the vehicle essentially immobile until said security device is simply detached by the vehicle-owner through means of a distensible-jaw element which is released by an integral latch/lock member; including an optional electronic audio-alarm provision whereby intimate contact between tire-tread and the armature/wedge-ramp acts to detain a switch-lever interconnected with the said lock, so that attempted forced removal of the wheel-immobilizer assembly activates an electronic audio-alarm circuit of substantially conventional design powered by enshrouded d.c.-battery current, which may be self-contained or remote-controlled via umbligal-cord plug-in arrangement; hence, an inexpensive portable anti-theft wheel-chock, having no installation-cost in the self-contained version.

16 Claims, 1 Drawing Sheet

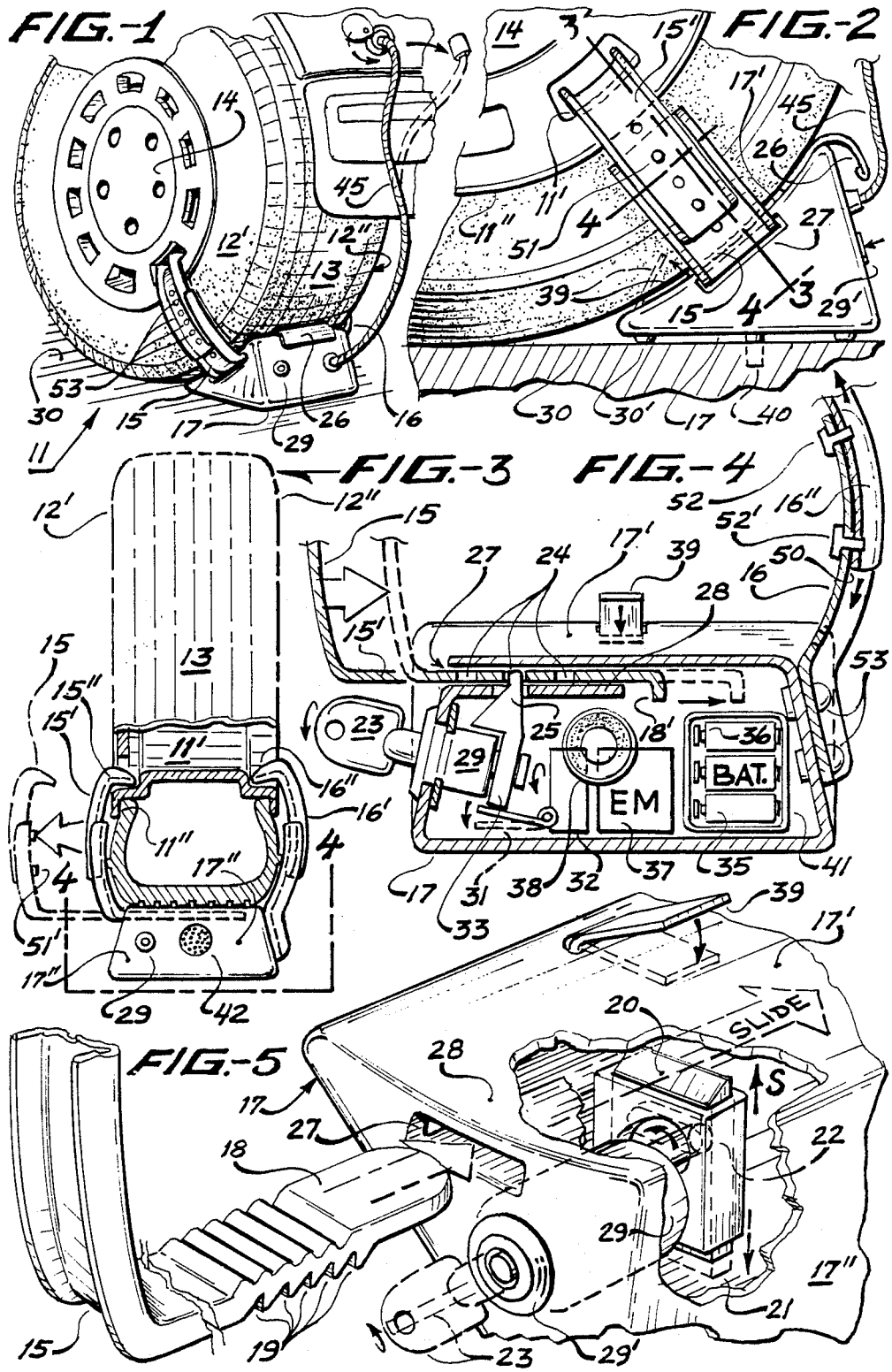

WHEEL IMMOBILIZER-CHOCK W/INTEGRAL LATCH AND ALARM

BACKGROUND OF THE INVENTION

Automobile theft in the USA has attained a notorious one-a-minute rate of occurance, which frequency has many owners resorting to all manner of expensive security apparatus in order to dissuade the would-be autothief from making their particular vehicle from becoming just another statistic of memory. This invention thus relates to such security devices which may serve to physically immobilize the vehicle, and in particular relates to appliances which may be readily attached to the wheel/tire aggregation so as to effectively check ability of the tire to rotate a full 360-degrees. Not only successful in defeating drive-ability, this 'wheel-chock' is a device which virtually eliminates any cost of initial professional installation upon purchase, and also easily stows away in the vehicle-trunk or underseat until secure parking installation is desired. Likewise, the wheelchock is generally useful for most any wheeled-vehicle such as a motorcar, motorcycle, and lt. aircraft where conventional 'wheel-chocks' are already commonly employed. Presently, the inventor is proceeding to produce this invention through instrumentality of the AutoAnchor$_{TM}$ Security-lock Mfg. & Mkt. Co. of San Diego; and at least two versions of the device are to be made available in both standard and commercial (heavy-duty) models. Furthermore, for purposes of text clarity, this special security-chock invention shall hereinafter be referred to as the 'Armature-chock' assembly per'se, while the amory like portion holding the locking elements is to be referred to as the Armature-body.

SUMMARY OF THE INVENTION

Accordingly, the Armature-chock invention hereof is an essentially mechanical device, featuring a preferably wedge-shaped Armature profile as viewed from the installed axial direction of orientation, whereby are included two opposed C-clamp like jaw appendages which extend oppositively from the right & left lateral sides of the Armature-block; thereby effectively engaging upon the tread portion of the tire while wraping radially about the inside and outside sidewalls of the tire, plus intruding into the adjacent wheel-flange rim region, thereby obviating any easy forced removal of the Armature-chock from the wheel/tire assembly.

The object of the Armature-chock is to essentially negate easy rolling of the wheel, hence vehicle, to which the device is installed. For even if a vehicle thief were to start driving away with the Armature-cuff clinched thereon, such a violent lurch and clamorous noise would be encountered upon such an attempted rolling-over of the Armature-block member, that the thief would be so befuddled as to quickly abandon the vehicle in search for easier prey in another neighborhood. Accordingly, in 99% of the cases, thieves will not linger to determine if they can try to install a substitute wheel/tire assembly.

Another object of this invention is to provide inexpensive however exceptionally durable construction, able to withstand considerable abuse without loss of ability to radially clinch fast upon the wheel/tire assembly; so that even if the vehicle were forced to override the blockage effect of the device, it would still cling tenaciously thereon only to the eventual possible detriment of the vehicle fender immediately surrounding the Armature-chock arc-of-rotation.

Another object of the invention is to provide a natural extra security modalit in the form of a Armature-chock thereby insuring safer parking in hilly street locations; whereby a mischievous person.could not merely kick away the Armature-chock, as could be done with an ordinary non-clinching wheel-chock.

Another object of the invention is to provide special construction which enables the Wheel-chock radially engaging C-clincher fingers to oppositively close upon the vehicle wheel/tire cross-section in a progressively incremental manner, thereby attaining as tight a fit as possible by manual installation, while accomodating a variety of different sized wheel/tire cross-sectional profiles.

Another object of the invention is to provide construction which may be economically reproduced, in different sizes both for different sized vehicles as well as different types of vehicles, for example one may wish to even install an Armature-chock on a wheelbarrel-wheel so as to make work-site theft more difficult. Materials employed in the Armature-body may be metal such as steel or heavy-guage aluminum, preferably with enclosed end-plates, although hi-impact fiberglass-impregnated plastic may be adaquate to defeat theft; yet it is best that the two clincher-fingers be made of rigidly heat-treated or tempered-steel.

Another object of this invention is to provide a Armature-block member having a preferably fixed-jaw wheel engaging element on one lateral side, and a releasably attached jaw element at the opposite lateral side—which may be slid transversely relative to the vehicle, so as to effect attachment or detatchment of the Armature assembly from the vehicle wheel/tire assembly.

Another object of the Armature-chock invention is to provide a special locking element which will positively hold the slider-tongue portion of the lateral opening/closing sliding-jaw at the exact degree of lateral or transversal clinch upon the wheel/tire assembly which is manually possible by a person of relatively slight build and minimal dexterity.

Another object of the Armature-chock invention is to provide a special locking element capable of being readily unlocked by use of an ordinary key device or combination-lock device, thereby eliminating need of any kind of special extractor-tool(s).

Another object of the Armature-chock invention is to provide a particular wedge shaped profile configuration, having a substantially flat-bottom portion for solid contact upon the street, possibly including rubber-button pads at each corner surface thereto; and a frontal surface preferably formed contiguously therefrom, which extends substantially upward but slightly inward toward the tire-tread region; and a wedging surface thereto preferably formed contiguously therefrom, so as to extend upward at an approximate 35-degree angle from the street plane; the described wedge formation being substantially flat where it contacts the tire-tread, yet preferably embodying a slight concave-arc which enables the wedge embodiment to even better interface upon the radius of the vehicle-tire in an intimate manner—thereby making unlawful removal essentially impossible even if the air-pressure were let from the tire for example.

Another object of this Armature-chock invention is to setforth an optional electronic audio-alarm modality which may interact with the main latch/locking element holding the sliding-jaw paw-member upon the tire/wheel; so that a spring-loaded sensor-switch, located either upon the armature/wedge surface or beneath the armature-body where it contacts the roadway, is biased to 'null'-position automatically when properly installed upon the tire—whereby forced detatchment of the security/wheel-chock will cause the switch to bias to 'close'-condition, activating the audio-alarm/electronic-circuit which is of substantially conventional 'whooper-siren' type design, which may be entirely self-contained with d.c.-battery within the said armature-body; however, an alternate option is to provide the armature-body with said integral interface sensors which merely serve as additional remote security-sensors in conjunction with a vehicles' existing door, hood, and deck type 'continuity' switches (usually on the positive ungrounded conductor-line) which is likewise powered by a d.c. battery enshrouded within the vehicle itself, said alternate arrangement being thus facilitated by use of an interconnecting electrical-conduit (minimum 2-conductor) with male/female plug-in to be situated on nearby fender-well region protected from outside tampering.

Another object of this Armature-chock invention is to provide an inexpensive security device which aggressively presents a highly-visible/non-passive deterent to the immediate discouragement of the would-be vehicle thief; in fact, the Armature-body is to be preferably finished in hi-identity yellow & black angle-striped colors, while the lateral jaws will be preferably finished in a bright-red vinyl-dip coating—virtually announcing the presence of the device.

Accordingly, while this invention will be further described in conjunction with certain preferred embodiments, it is intended that the invention as setforth will not be limited to such specific features; on the contrary, it is intended to cover all alternatives, modifications, and equivalents which may be found within the spirit and scope of the invention, as is further defined in the following specifications.

BRIEF DESCRIPTIONS OF THE ILLUSTRATIONS:

The proceeding summary, as well as further objects, features, and advantages of the invention, will be more fully appreciated and clarified by reference to the following detailed drawings of the preferred embodiment, which is shown in accordance with the present Claims; wherein:

FIG. 1 is a general ¾ perspective pictorial view of the invention as it appears installed upon an ordinary vehicle wheel/tire-aggregation in a normal locked condition.

FIG. 2 is a side/elevation-view of the invention of FIG. 1, although only a portion of the wheel/tire is included so as to enlarged details of the device.

FIG. 3 is a frontal/elevation-view taken at a right angle to the radial cross-section of the tire, as is indicated in FIG. 2.

FIG. 4 is an enlarged internal detail view of FIG. 3, wherein the cutaway cross-section plane is referenced in FIG. 2, and the Armature is shown to be hallow in construction so as to integrally contain the components shown therein.

FIG. 5 is an alternate viewing angle in an enlarged detail view taken at an angle of position similar to FIG. 1, wherein a major cut-away portion reveals another manner of locking-mechanism.

SPECIFICATIONS OF THE PREFERRED EMBODIMENTS:

The general pictorial depiction of the invention 10 as revealed in FIG. 1 shows a typical appearance of the Armature-chock when installed, whereby the exemplified 'object' being secured from rotation is a conventional vehicle wheel 11 upon which is mounted a standard tire 12, and ordinary hubcap 14; wherein also seen is the wheels' annular rim surface 11' and final rim-flange 11" just adjacent to the tires' sidewalls 12' and 12" and tire-read surface 13; all of which are also shown clearly in FIG. 3 as well.

Reference to FIGS. 1/2/3 also clearly shows the two opposed Jaw elements 15 and 16 which radially clinch upon both the outside and inside sidewalls of the tire, while actually engaging around the wheel/rim flanges 11' and 11" through provision of the final paw entities 15" and 16" which serve to positively prevent forced disengagement removal of the Wheel-cuff assembly 10 from the wheel/tire aggregation 11/12.

Study of FIG. 2 also shows how the armory-housing like armature 17 is preferably constructed as a wedge-shaped formation, not drastically unlike that of an ordinary wheel-chock implement commonly used to check the rolling movement of wheeled vehicles, particularly light-aircraft; whereby now, upon the advent of this subject invention, the aircraft or other wheeled vehicle may be readily secured from rolling-damage or theft by virtue of its lock-on system, for once installed, the invention remains fixed to the wheel/tire member until legally unlocked and detatched. Note also how the upper wedge-surface 17' is preferably formed slightly concave so as to more intimately interface against the tire-tread surface 13; although a particular nominal wedge-slope angle of about 35 degrees is generally best to fit most automobile tire diameters. Note also, that the clinching Jaws 15 and 16 extend radially inward directly toward the central-axis of the wheel-hub region 14. Other features are the optional rubber/contact buttons 30', which are merely pressed into four holes made into the armature under-surface 17 and it also may be seen how the armature outer-side is extended upward at a slight splay-angle toward the tire-tread, so as to improve the crush-resistance of the armature 17 without added weight.

Next, FIG. 4 shows how the Armature-chock assembly 10 appears when removed from locking-modality, and the Jaw element 15 is drawn laterally open to maximum jaw-opening position, and although it could be easily made entirely removable from the clincher jaws or C-finger/armature 17, it is preferred that the Jaw element 15 be retained by a limiter-tab 18' so that the slider-bar portion 18 stays partly intact, thereby eliminating inconvenient fumbling in the dark in effort to reinsert the disconnected slider-bar, should it inadvertantly fall loose, which might otherwise eventually result in loss of this vital element.

Examination of FIG. 5 demonstrates how the preferred rachet-sawteeth 19 are positively engaged by a simple sear-lug 20 which is biased under spring-tension 'S', but caused to be lifted away to releasing position 21 through actuation of a key biased follower 22, and the hand rotated key 23. Although not shown for reason of obviousness, a combination-lock assembly may be substituted for the key embodiment shown if it is a design preference. In contrast, FIG. 4 shows an alternate type of slider-bar configuration having indexing-notches 24 into which a dead-bolt style of sear-latch 25 is engaged; thereby demonstrating the variety of methods by which the Slider-bar tongue 18 may be coupled into the Armature-body 17 so as to achieve the desired 'clinching' action.

Still other features of the 'Wheel-chock' invention, are indicated as the carrying-handle 26 which is shown here simply spot/resistance-welded to the metal envelopment of the Armature-body outer supporting-surface 17''; and the laterally positioned tongue-slot 27, which as shown in FIG. 4 receives the Slider-bar tongue 18 of the jaw member 15, and the armatures' internal guide-support 28 which is suitably arranged therein so as to provide a proper 'slip-fit' for easy lateral movement of the sliding jaw element when the slider-bar tongue 18 is instantly released by the unlocking-action of the substantially conventional rotary/tumbler-lock unit 29; and while the essential opposing jaw appendage 16 is shown permanently fixed to the Armature-wall 17' via two rivets 53 for example. Additionally, the ground-surface 30 upon which the entire aggregation is supported, is best seen in the side-elevation view of FIG. 2, but is understood to be present in all normal implementations of this immobilizer invention.

Additionally, an optional electronic audio-alarm system is also offered in this Wheel-chock invention, and is best revealed in FIG. 4, again, wherein in addition to the integral locking mechanism 29 is exemplified a co-operatively engaging finger 31 of a single-pole/double-throw electrical-switch 32 acting upon cam like surface 33 of the sear-latch 25, so as to bias the preferably spring-tensioned micro-switch 32 from an electronically 'closed' condition when the armature jaw tongue 18 is in a locked condition, to an electronically 'open' condition when the Armature-lock 29 is in an unlocked condition for example. The interlock switch 32 is the master-switch for the electronic-circuitry powered by the usually six internally contained d.c./Alkaline-batteries 35 held into a conventional snap-in battery-housing having integral series-continuity/contact-elements 36, which supply electrical current to both the substantially standard EM/electronic module 37 to generate the desired conventional 'wooper-siren' alarm sound (or such equivalent security audio-signal) reproduced through a standard audio-transducer 38. The essential sensor-switch placements may be at the surface of the wedge-ramp 17', wherein a finger-lever 39 is shown being depressed against the tread surface 13 of the tire. Thus, displaced to bias from a normally-opened position to a nor closed switching position, which completes the security circuit in a manner activating the said audio-transducer 38 in a customary hi-decible manner intended to disuade further tampering. Likewise, an alternate sensor-switch plunger 40 is seen in FIG. 2 interfacing upon the roadway 30 so as to remain biased in an 'open' circuit mode, until the vehicle may be so moved as to cause the plunger 40 to bias into a 'closed' circuit mode, thereby again activating the EM/circuit for audible alarm. It is obvious that said switches may be incorporated in various ways to achieve an equivalent result as described, although in any case it is important that the battery housing portion be accessed only from behind at the ramp surface 17' preferably via flush-fitting plate 41 which is best secured by multipul allen-head screws so as to effectively detain any vandal from quick access to the self-contained d.c. power. Furthermore, it is desired that the audio-transducer 38 be protected from invasive tampering damage by means of a metal/-baffle plate (concealed from view here) just inside behind the audio-outlet 42; and similarly, the EM/circuit is preferably of the potted-encapsulated type so as to resist damage by invasion of water therein.

An alternate audio/security-system embodiment of FIG. 2 provides for elimination of the self-contained battery section 35 and EM/circuit-module 37 in preference to a method whereby a minimal 2-conductor umbilical electrical-cord conduit 45 is routed out of the thus 'remote' armature-housing, so as to be simply plugged into a suitable male/female electrical-junction connector having like 2-conductor elements, and should be situated in a fairly nearby region of the fender-well region where it is necessarily protected from vandal tampering through presence of existing carbody enshrouding. Thus this alternate audio/security-system would employ only the said one or two supplementary tire/ground-interfacing contact sensor-switches, to be efficiently inter-coupled with any already existing electronic/audio-alarm system housed within the confines of the vehicle itself. This would usually be of the type vehicle security-system already incorporating the numerous door, hood, deck etc. continunity-sensors—so that when the portable security invention is connected with that same circuit, any disruption of the 'line voltage' or 'continuity' (dependant upon the electrical system employed) will result in instant activation of the alarm within the vehicle in an otherwise conventional manner.

Moreover, since it is desirable to make the security/-wheel-immobilizer substantially universal as to adaptation upon the various tire cross-sections offered by domestic and foreign automobiles, FIGS. 1/2/3 show an embodiment of both the left 15 and right 16 jaw members whereby an overlapping joint 50 enables inboard portions 15/16 to be lapped over by outboard portions 15'/16' while adjustably secured in one of three indices positions by virtue of repositionable screwfasteners 51/51' and 52/52' which are suitably secured from the inside surface into threaded incremental holes 53 according to the particular radial/profile-height of the tire cross-section installation encountered, which may even vary sufficiently between front and rear wheels as to require slightly different radial adjustments in some applications.

Lastly, it will be apparent to those skilled in the art herein discussed, that still further variations, alterations, and modifications may be resorted to according to the format setforth in this presently preferred embodiment, without departing from the intendea 'spirit & scope' of the invention; which is still further recited in the appended claims and their legal or technical equivalents.

What I claim of originality is:

1. A non-passive hand-portable mechanical immobilizer security-device for prevention of wheeled vehicle theft, by method of manual attachment upon an existing wheel/tire assembly so as to thereby impose an impediment to full rotation ability; comprising:

a. an armature-body, configured as to include a surface portion made to rest substantially against a sector of the tire-tread, and an adjacent surface portion thereof normally able to interfere upon the ground, the combination being tantamount to a captively appended wheel-chock;

b. two laterally opposed jaw like arms, rigidly extending relative from said armature body so as to thereby radially engage substantially about the said wheel/tire cross-section in clinching retention thereto;

c. an integral key-latching or equivalent type of substantially standard internal locking mechanism for sucurely detaining a laterally sliding jaw member in clinched position against the wheel/tire assembly until instant release of the said clinching action is manually accomplished by the user via key unlocking action;

d. an adjustable sizing means, accomodating physical variations in wheel/tire cross-section dimensions;

e. an optional electronic/audio-alarm provision, whereby said surfaces may include 'forced displacement' sensing means, becomming activated if the armature body is separated from secure attachment upon the wheel/tire assembly, and/or upon armature body surface displacement from effective ground contact.

2. An immobilizer device according to the invention of claim 1, wherein said armature is preferably configured to a wedge shaped profile as viewed from the tire sidewall, so that a wheel-chock like formation is made.

3. An armature component according to claim 2, wherein said wedge formation includes a surface triad, the first contacting the tire-tread, the second contacting the ground, and the third being an outward surface serving to aid support of the others two from collapsing under weight of the vehicle.

4. A wedge according to claim 3, wherein the said tread contacting surface is given a slight concave arc formation, so as to more intimately interface with the tire-radius.

5. A wedge according to claim 3, wherein said surface triad includes two laterally disposed side-surfaces, which substantially fill-in the remaining voids, thereby affording added anti-tamper protection to the confines of the structure.

6. An armature device according to claim 2, wherein the body thereof is approximately the width of the vehicle tire, and may be so configured as to appear substantially circular or square in a laterally viewed profile.

7. An immobilizer device according to the invention of claim 1, wherein said armature includes at least two opposed jaw lements made of a rigid hi-strength material, and outwardly disposed from the lateral ends of the armature so as to extend radially inwardly therefrom toward the wheel-hub; whereby one said sliding jaw includes an integral tongue like slider-bar portion which stems into the armature at an approximate right-angle so as to form a clinching engagement about the wheel/tire aggregation in conjunction with the other said laterally opposed jaw element.

8. An opposed jaw arrangement according to claim 7, wherein said outward tips of the jaw elements include substantially inwardly facing paw like final ends, so as to provide a more positively secured clinching action about the wheel/tire member.

9. The jaw elements according to claim 7, wherein the said material is preferably hi-carbon heat-treated steel, or equivalent; which may be clad with a colorful hi-identity non-scuff vinyl-coating or equivalent, so as to not mar an aluminum wheel.

10. A jaw detainer according to the invention of claim 1, wherein said locking means is a substantially standard type of key-lock or combination-lock type mechanism built into the armature body, and having a movable-sear element therewith capable of being thereby biased away from a secured locking position relative to the detentive-indexing means.

11. A locking apparatus according to claim 10, wherein said slider-bar detentive-indexing means is a multi-stationed positive retention type of mechanism, such as a slider-bar portion having a saw-toothed rachet-tongue surface, or, a multi-notched, or multi-holed or detented tongue configuration; whereby a progressively tighter clinching action is provided, as well as a simultaneous sizing-adjustment upon the wheel/tire member; thereby instantly unlockable as well.

12. A security immobilizer invention according to claim 1, whereby said alarm circuit is a substantially standard electronic-module capable of producing an ongoing siren sound or equivalent hi-decible alarm to ward off an ensuing thief; being powered by a d.c. battery source contained within the said armature-body.

13. An electronic alarm option according to claim 12, wherein said EM/circuit is activated or deactivated only via user switching of a substantially standard key-latching mechanism biasably coupled to a substantially standard electrical master-switch arrangement; including a normally closed sensor-switch in the circuit between a self-contained d.c. battery power-source and said master-switch, whereby said sensor-switching is automatically biased from an 'open' circuit condition, so as to thereby cause operation of the said alarm-circuit.

14. An electronic alarm option according to claim 12, whereby said alarm-circuit and battery source are already existing within the confines of the attendant vehicle, whereby a plug-in 'umblical-cord' like electrical-conduit having at least two conductors thereto for essential communication of the electrical-circuit 'continunity' with the supplementary sensor-switch provisions contained within the said 'remote' wheel/tire armature-unit.

15. An immobilizer invention according to claim 1, wherein said lateral jaws are made with adjustably overlapping surface joints, said surfaces having suitably incremental indices provision as to facilitate securely repositionable adaptation to the radial/profile-height of a particular given wheel/tire application.

16. An immobilizer invention according to claim 1, wherein said jaws are each made radially adjustable so as to accomodate different tire/profile heights; said adjustment provision comprising a 2-piece overlapping finger construction empodying threaded incremental settings thereto enabling the said two pieces to be secured together at the required installation length via threaded conventional fasteners inserted form the inboard facing side of the jaw members; hence, being inaccessibly tamper-proof during security installation of the immobilizer device upon the vehicle tire/wheel assembly.

* * * * *